US012807796B2

(12) United States Patent
Lee et al.

(10) Patent No.: US 12,807,796 B2
(45) **Date of Patent: *Nov. 24, 2026**

(54) SEMICONDUCTIVE RESIN COMPOSITION FOR ULTRA-HIGH-VOLTAGE CABLE, HAVING EXCELLENT PROCESSABILITY, AND PREPARATION METHOD THEREFOR

(71) Applicant: HANWHA SOLUTIONS CORPORATION, Seoul (KR)

(72) Inventors: In Jun Lee, Daejeon (KR); Jae Yun Lim, Daejeon (KR); Kisik Kim, Daejeon (KR); Jeong Hyun Park, Daejeon (KR); Sang Kyu Park, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 566 days.

This patent is subject to a terminal disclaimer.

(21) Appl. No.: 18/275,720

(22) PCT Filed: Feb. 17, 2022

(86) PCT No.: PCT/KR2022/002333

§ 371 (c)(1),
(2) Date: Aug. 3, 2023

(87) PCT Pub. No.: WO2022/182055

PCT Pub. Date: Sep. 1, 2022

(65) Prior Publication Data

US 2024/0117168 A1 Apr. 11, 2024

(30) Foreign Application Priority Data

Feb. 23, 2021 (KR) ........................ 10-2021-0023895

(51) Int. Cl.

*C08L 23/0869* (2025.01)
*C08K 3/04* (2006.01)
*C08K 5/00* (2006.01)
*C08K 5/098* (2006.01)

(52) U.S. Cl.

CPC ............ *C08L 23/0869* (2013.01); *C08K 3/04* (2013.01); *C08K 5/005* (2013.01); *C08K 5/098* (2013.01); *C08K 2201/012* (2013.01); *C08L 2201/08* (2013.01); *C08L 2205/025* (2013.01); *C08L 2312/00* (2013.01)

(58) Field of Classification Search

None
See application file for complete search history.

(56) References Cited

U.S. PATENT DOCUMENTS

| | | | | |
|---|---|---|---|---|
| 2008/0283273 | A1* | 11/2008 | Nam | H01B 1/24 524/69 |
| 2008/0308296 | A1* | 12/2008 | Smedberg | B32B 27/26 174/120 SR |
| 2011/0162868 | A1 | 7/2011 | Torgersen et al. | |
| 2013/0344329 | A1* | 12/2013 | Perego | H01B 3/441 428/379 |
| 2017/0169920 | A1 | 6/2017 | Liu et al. | |
| 2019/0180889 | A1* | 6/2019 | Yang | C08L 23/0869 |

FOREIGN PATENT DOCUMENTS

| | | | |
|---|---|---|---|
| CN | 1174045 | C | 11/2004 |
| KR | 10-2004-0082835 | A | 9/2004 |
| KR | 10-2004-0085896 | A | 10/2004 |
| KR | 10-2006-0111019 | A | 10/2006 |
| KR | 10-2011-0035536 | A | 4/2011 |
| KR | 10-2014-0112063 | A | 9/2014 |
| KR | 10-2019-0015116 | A | 2/2019 |
| TW | 201632575 | A | 9/2016 |

OTHER PUBLICATIONS

Ki-Joung Lee et al., "Electrical and Mechanical Properties of Semiconductive Composites for DC Power Cable", J. Kieeme, Feb. 2013, pp. 119-125, vol. 26, No. 2.
International Search Report for PCT/KR2022/002333 dated, May 24, 2022 (PCT/IS/210).
Communication dated Jul. 16, 2024 issued by the Japanese Patent Office in application No. 2023-543178.

* cited by examiner

*Primary Examiner* — Christopher M Rodd
(74) *Attorney, Agent, or Firm* — Sughrue Mion, PLLC

(57) ABSTRACT

The present invention relates to a semiconductive resin composition for a high voltage power cable. Specifically, the present invention relates to a semiconductive resin composition comprising a base resin in which ethylene butyl acrylates having different melting indices are mixed, carbon black, an antioxidant, and a crosslinking agent. In addition, the present invention relates to a semiconductive resin composition for a high voltage power cable, the composition having excellent scorch stability and processability and low volume resistance even at a high temperature.

12 Claims, No Drawings

SEMICONDUCTIVE RESIN COMPOSITION FOR ULTRA-HIGH-VOLTAGE CABLE, HAVING EXCELLENT PROCESSABILITY, AND PREPARATION METHOD THEREFOR

CROSS REFERENCE TO RELATED APPLICATIONS

This application is a National Stage of International Application No. PCT/KR2022/002333 filed Feb. 17, 2022, claiming priority based on Korean Patent Application No. 10-2021-0023895 filed Feb. 23, 2021.

TECHNICAL FIELD

The following disclosure relates to a semiconductive resin composition for a high voltage power cable. More specifically, the following disclosure relates to a semiconductive resin composition for a high voltage power cable having excellent scorch stability and processability and having low volume resistance even at a high temperature.

BACKGROUND ART

In general, a power cable may be formed of a conductor part formed of a metal such as aluminum or copper, an inner semiconducting layer surrounding the conductor and being coated thereon, an insulating layer coated thereon, an outer semiconducting layer, and an exterior layer disposed on an outer side of the outer semiconducting layer for protecting the cable itself, and the like, and the structure may be changed, if required.

The purpose of using a semiconducting layer is to prevent insulation breakdown due to deterioration of an insulating layer and life shortening of a power cable, by radially equalizing a local electric field, since a high voltage may be applied to an insulating layer by electric field distortion which may occur between a conductor and a neutral line.

The semiconducting layer may include an ethylene copolymer such as an ethylene vinyl acetate (EVA) copolymer and an ethylene butyl acrylate (EVA) with carbon black in a sufficient amount to be semiconductive, a peroxide crosslinking agent, and a common additive, in order to faithfully fulfill its original role in forming a power cable.

The semiconducting layer has increased volume resistance with increased temperature, since a conductive network of a semiconductive material is destroyed by the temperature to obstruct a passage of electrons, resulting in an increase in the volume resistance.

Accordingly, in order to lower the volume resistance value, a content of a conductive material such as carbon black is increased, but processability and mechanical strength may be lowered.

Thus, in order to improve processability, different kinds of polymer resins are mixed, but miscibility of the semiconducting layer composition may be lowered to reduce surface smoothness. In addition, processability may be increased by further including an additive, but additional costs may be incurred and there may be a difficulty in uniform mixing, and thus, it is difficult to industrially adopt the method.

Therefore, a semiconductive composition which has excellent processability and mechanical strength and also exerts sufficient semiconducting properties is desperately needed in the technical field.

RELATED ART DOCUMENTS

Patent Documents (Patent Document 1) Korean Patent Laid-Open Publication No. 10-2019-0015116 (Feb. 13, 2019)

DISCLOSURE

Technical Problem

An embodiment of the present invention is directed to providing a semiconducting layer composition which has excellent processability and miscibility and also has excellent mechanical strength, without using a base resin formed by mixing different kinds of polymers from each other or further adding carbon black, and, in particular, a semiconducting layer composition having surface smoothness and low volume resistance at a high temperature.

Technical Solution

In one general aspect, a semiconductive resin composition includes: a base resin formed by mixing two ethylene butyl acrylate resins having melt indexes satisfying the following Equations 1 and 2, carbon black, an antioxidant, and a crosslinking agent:

$$1 \leq MI_1 \leq 10 \quad \text{[Equation 1]}$$

$$11 \leq MI_2 \leq 30 \quad \text{[Equation 2]}$$

wherein $MI_1$ is a melt index of a first ethylene butyl acrylate resin, $MI_2$ is a melt index of a second ethylene butyl acrylate resin, and the melt index is measured under the conditions of 125° C. and 2.16 kg in accordance with a measurement method of ASTM D1238, the unit of the melt index being g/10 min.

The $MI_1$ and $MI_2$ values of the base resin according to an exemplary embodiment of the present invention may satisfy the following Equation 3:

$$10 \leq MI_2 - MI_1 \leq 20 \quad \text{[Equation 3]}$$

The base resin according to an exemplary embodiment of the present invention may include the first ethylene butyl acrylate resin having $MI_1$ of 5 to 10 g/10 min and the second ethylene butyl acrylate resin having $MI_2$ of 15 to 25 g/10 min.

In the base resin according to an exemplary embodiment of the present invention, the first ethylene butyl acrylate resin may be an ethylene butyl acrylate copolymer having a content of a structural unit derived from a butyl acrylate monomer of 15 to 18 mol % and a melt index of 5 to 10 g/10 min, and the second ethylene butyl acrylate resin may be an ethylene butyl acrylate copolymer having a content of a structural unit derived from a butyl acrylate monomer of 19 to 22 mol % and a melt index of 17 to 22 g/10 min.

The antioxidant according to an exemplary embodiment of the present invention may include any one or more selected from phenolic compounds and thioether-based compounds.

The semiconductive resin composition according to an exemplary embodiment of the present invention may further include a metal stearate.

The metal stearate according to an exemplary embodiment of the present invention may include zinc stearate, calcium stearate, aluminum stearate, and magnesium stearate.

The semiconductive resin composition according to an exemplary embodiment of the present invention may include 30 to 100 parts by weight of the carbon black, 0.01 to 5 parts by weight of the antioxidant, and 0.1 to 10 parts by weight of the crosslinking agent, with respect to 100 parts by weight of the base resin.

In another general aspect, a semiconductive resin cured product obtained by crosslinking the semiconductive resin composition may be provided.

The semiconductive resin cured product according to an exemplary embodiment of the present invention may have a crosslink density in accordance with a moving die rheometer (MDR) of 15 dNm or more.

The semiconductive resin cured product according to an exemplary embodiment of the present invention may have a volume resistance in accordance with ASTM D991 of 130 Ω·cm or less at 135° C.

In still another general aspect, a method of producing a semiconductive resin cured product includes: a) adding the base resin of claim 1, carbon black, and an antioxidant to a first kneader and performing kneading to produce a composite resin; b) producing the composite resin into a composite resin chip form; c) adding the composite resin chips and a crosslinking agent to a second kneader and performing mixing to produce a semiconductive resin composition; and d) crosslinking and aging the semiconductive resin composition to provide a semiconductive resin cured product.

A crosslinking time in step d) according to an exemplary embodiment of the present invention may be 10 minutes or more.

Advantageous Effects

The semiconductive resin composition according to the present invention includes a base resin formed by mixing ethylene butyl acrylates having melt indexes different from each other, and an oxidizing agent having a specific structure and carbon black, thereby having both excellent miscibility and excellent mechanical strength such as tensile strength and elongation.

In addition, the semiconductive composition may have a lowered volume resistance value by controlling only the melt index value of the ethylene butyl acrylate, and thus, there is no need to further add a conductive material for lowering the resistance.

In addition, the semiconductive composition may achieve optimal volume resistance at a high temperature while maintaining excellent mechanical strength and processability, by also controlling the content of a unit structure including a butyl acrylate monomer of ethylene butyl acrylate.

BEST MODE

Hereinafter, the present invention will be described in more detail by the following specific examples or exemplary embodiments. However, the following specific examples or exemplary embodiments are only a reference for describing the present invention in detail, and the present invention is not limited thereto, and may be implemented in various forms.

In addition, unless otherwise defined, all technical terms and scientific terms have the same meanings as those commonly understood by one of those skilled in the art to which the present invention pertains. The terms used herein are only for effectively describing a certain specific example, and are not intended to limit the present invention.

In addition, the singular form used in the specification and claims appended thereto may be intended to also include a plural form, unless otherwise indicated in the context.

In addition, unless particularly described to the contrary, "comprising" any elements will be understood to imply further inclusion of other elements rather than the exclusion of any other elements.

In addition, a high temperature described herein refers to a temperature of 90° C. or higher.

The present inventors found that by providing a semiconductive composition including a base resin formed by mixing ethylene butyl acrylates having melt indexes different from each other, a semiconductive composition having excellent mechanical properties and processability and also having excellent volume resistance may be provided without adding an additive or a conductive material, and thus, completed the present invention.

An exemplary embodiment of the present invention may be a semiconductive resin composition including: a base resin formed by mixing two ethylene butyl acrylate resins having melt indexes satisfying the following Equations 1 and 2, carbon black, an antioxidant, and a crosslinking agent:

$$1 \leq MI_1 \leq 10 \quad \text{[Equation 1]}$$

$$11 \leq MI_2 \leq 30 \quad \text{[Equation 2]}$$

wherein $MI_1$ is a melt index of a first ethylene butyl acrylate resin, $MI_2$ is a melt index of a second ethylene butyl acrylate resin, and the melt index is measured under the conditions of 125° C. and 2.16 kg in accordance with a measurement method of ASTM D1238, the unit of the melt index being g/10 min.

By forming the base resin included in the semiconductive composition by mixing the first ethylene butyl acrylate resin satisfying the melt index value in a range of $MI_1$ and the second ethylene butyl acrylate satisfying the melt index value in a range of $MI_2$, the processability of the semiconductive composition is improved and the miscibility in the composition is also excellent. In addition, the present inventors found that the semiconductive composition including the base resin has an effect of having significantly lowered volume resistance as compared with a resin in which one ethylene butyl acrylate and two polymer resins different from each other are mixed, though the reason is not known.

The effect of having lowered volume resistance is a qualitatively different effect, caused only by mixing the first ethylene butyl acrylate resin and the second ethylene butyl acrylate resin satisfying the above Equations 1 and 2, without including an additive conductive material, and the volume resistance may be lowered without deterioration of the processability and the mechanical properties of the semiconductive composition itself.

In addition, according to an exemplary embodiment of the present invention, the base resin may have the $MI_1$ and $MI_2$ values satisfying the following Equation 3 to have further lowered volume resistance at a high temperature:

$$10 \leq MI_2 - MI_1 \leq 20 \quad \text{[Equation 3]}$$

In the case of the semiconducting layer, the temperature of the semiconducting layer is raised with an increased volume resistance value, and the structure of the semiconducting layer is destroyed, finally resulting in shortening of a cable life.

When a difference between $MI_1$ and $MI_2$ values of the first ethylene butyl acrylate resin and the second ethylene butyl acrylate resin satisfies the above range, it is confirmed that volume resistance at a high temperature is further lowered.

The semiconducting layer has lower volume resistance at a high temperature, thereby suppressing the destruction of the semiconducting layer, and thus, finally having an effect of suppressing shortening a cable life.

In addition, when the base resin according to an exemplary embodiment of the present invention satisfies $MI_1$ of 5 to 10 g/10 min and $MI_2$ of 15 to 25 g/10 min and also satisfies Equation 3, the volume resistance may be further lowered.

In addition, according to an exemplary embodiment of the present invention, in the base resin, when the first ethylene butyl acrylate resin is an ethylene butyl acrylate copolymer having a content of a structural unit derived from a butyl acrylate monomer of 15 to 18 mol % and a melt index of 5 to 10 g/10 min and the second ethylene butyl acrylate resin is a ethylene butyl acrylate copolymer having a content of a structural unit derived from a butyl acrylate monomer of 19 to 22 mol % and a melt index of 17 to 22 g/10 min, a semiconductive composition having a lowest volume resistance at a high temperature may be provided.

The semiconductive composition includes an antioxidant, thereby suppressing a change of the semiconductive composition for a long period of time after processing, while maintaining excellent volume resistance at a high temperature, processability, and mechanical strength.

The antioxidant according to an exemplary embodiment of the present invention may be any one or more selected from phenolic compounds and thioether-based compounds.

Specifically, the phenolic compound may include one or more selected from the group consisting of 2,2'-thioethylene-bis-(3,5-di-t-butyl-4-hydroxyphenyl)propionate, 4,4'-thio-bis-(2-t-butyl-5-methylphenol), 1,2-dihydro-2,2,4-trimethylquinoline, diethyl((3,5-bis-(1,1-dimethylethyl)-4-hydroxyphenyl)methyl)phosphonate, 1,3,4-tris(4-tert-butyl-3-hydroxy-2,6-dimethylbenzene)-1,3,5-triazine-2,4,6-(1H, 3H,5H)-trione, tetrakis[methylene-3-(3,5-di-tert-butyl-4-hydroxyphenyl)propionate]methane, octadecyl-3-(3,5-di-tert-butyl-4-hydroxyphenyl)propionate, tris(2,4-di-tert-butylphenyl)phosphite, N,N'-bis-(3-(3',5'-di-t-butyl-4'-hydroxyphenyl)propionyl)hydrazine, and the like, but is not limited thereto.

In addition, the thioether-based compound may include one or more selected from dilauryl thiodipropionate, ditridecyl thiodipropionate, dimyristyl thiodipropionate, dioctadecyl disulfide, bis[2-methyl-4-(3-n-dodecylthiopropionyloxy)-5-tert-butyl phenyl]sulfide, pentaerythritol-tetrakis-(3-laurylthiopropionate), 1,4-cyclohexanedimethanol, 3,3'-thiobispropanoic acid dimethyl ester polymer, distearyl thiodipropionate, and the like, but is not limited thereto.

By using the antioxidant, when the semiconductive resin composition is processed, the processability of a polymer is increased, and oxidation of the polymer is prevented.

The semiconductive composition is crosslinked using a crosslinking agent. One appropriate method is impregnation of a crosslinking agent in polymer powder or a polymer pellet. Subsequently, the mixture is heated at a higher temperature than a decomposition temperature of the crosslinking agent. An appropriate crosslinking agent used may include, for example, (di(tert-butylperoxyisopropyl)benzene, 1,1-(tertiary butylperoxy)-3,3,5-trimethylcyclohexane, N-butyl-4,4-(bis-butyl peroxy)valerate, dicumyl peroxide, perbutyl peroxide, 1,1-bis(tertiary-butylperoxy)-diisopropylbenzene, benzoyl peroxide, 2,5-dimethyl-2,5-di-tertiary-butylperoxyhexane, tertiary-butyl peroxybenzoate, di-tertiary-butylperoxide, 2,5-dimethyl-2,5-di-tertiary-butylperoxylhexane, and the like, preferably perbutyl peroxide, 1,1-(tertiary butylperoxy)-3,3,5-trimethylcyclohexane, benzoyl peroxide, dicumyl peroxide, and the like, and more preferably, dicumyl peroxide and perbutyl peroxide, but is not limited thereto.

According to an exemplary embodiment of the present invention, 30 to 100 parts by weight of carbon black, 0.01 to 5 parts by weight of the antioxidant, and 0.1 to 10 parts by weight of the crosslinking agent may be included, with respect to 100 parts by weight of the base resin, preferably, 40 to 90 parts by weight of carbon black, 0.1 to 3 parts by weight of the antioxidant, and 0.3 to 5 parts by weight of the crosslinking agent may be included, with respect to 100 parts by weight of the base resin, and more preferably, 55 to 60 parts by weight of carbon black, 0.2 to 1 part by weight of the antioxidant, and 0.5 to 3 parts by weight of the crosslinking agent may be included, with respect to 100 parts by weight of the base resin, but the present invention is not limited thereto.

Since the content of the semiconductive composition satisfies the range, a semiconductive composition, which has appropriate crosslinking time and crosslinking degree to have excellent processability and mechanical strength, is not changed even with long-term use, and has excellent volume resistance, may be provided.

In addition, according to an exemplary embodiment of the present invention, the semiconductive composition may include a metal stearate-based compound and the like, specifically, zinc stearate, calcium stearate, aluminum stearate, magnesium stearate, and the like, preferably, calcium stearate and zinc stearate, and more preferably zinc stearate, but is not limited thereto.

By further including the metal stearate, polymer sloughing may be minimized. The semiconducting layer of the present invention produced from the content of the metal stearate does not have protrusions on the surface and may impart excellent surface properties. In addition, the metal stearate improves flowability of the electrically conductive resin composition, and when molded, may minimize an electrical conductivity deviation due to elongation.

The semiconductive resin composition may further include a processing aid. The processing aid may include montan wax, fatty acid esters, triglyceride or its partial esters, glycerin esters, polyethylene wax, paraffin wax, metal soap-based lubricants, amide-based lubricants, and the like, and preferably, may include fatty acid esters, triglyceride or its partial esters, and polyethylene wax, but is not limited thereto.

By further including the processing aid, releasability with the conductor of the composition may be improved and an extrusion load may be lowered.

A semiconductive resin cured product may be produced by crosslinking the semiconductive resin composition according to an exemplary embodiment. The crosslinked semiconductive resin cured product has excellent processability and mechanical strength, has excellent volume resistance even at a high temperature, and is appropriate for use in a semiconducting layer of an ultra-high voltage cable wire.

Elements such as mechanical properties and volume resistance may be changed depending on the crosslinking degree of the semiconductive resin cured product, and the crosslinking degree may be determined by a crosslink density.

The crosslinked semiconductive resin cured product may have a crosslink density in accordance with a moving die rheometer (MDR) of 15 dNm or more, preferably 16 to 20 dNm, and more preferably 17 to 18 dNm, but is not limited thereto.

When the cured product has the crosslinking degree satisfying the crosslink density range, both excellent mechanical properties and excellent processability may be satisfied.

The semiconductive resin cured product according to an exemplary embodiment of the present invention may have a volume resistance in accordance with ASTM D991 of 170 Ω·cm or less, preferably 150 Ω·cm or less, and more preferably 100 Ω·cm or less at 90° C.

In addition, the semiconductive resin cured product may have a volume resistance in accordance with ASTM D991 of 150 Ω·cm or less, preferably 140 Ω·cm or less, and more preferably 130 Ω·cm or less at 135° C., but is not limited thereto.

Hereinafter, a method of producing the semiconductive composition will be described.

According to an exemplary embodiment of the present invention, the semiconductive composition may be produced by including: a) adding the base resin of claim 1, carbon black, and an antioxidant to a first kneader and performing kneading to produce a composite resin;

- b) producing the composite resin into a composite resin chip form;
- c) adding the composite resin chips and a crosslinking agent to a second kneader and performing mixing to produce a semiconductive resin composition; and
- d) crosslinking and aging the semiconductive resin composition to provide a semiconductive resin cured product.

In step a), a temperature of the first kneader may be 90 to 120° C., but is not limited thereto as long as it is a commonly used temperature. As the first kneader, a Banbury mixer (dispersion type kneader) or the like may be used, but is not limited thereto as long as it is commonly used equipment.

In step b), the composite resin kneaded in the first kneader may be produced into a chip form for smooth processing, and the chips may be produced by passing through a roll mill and a crusher, but the equipment is not limited thereto as long as it is commonly used.

The size of chips may be 2 to 10 mm, preferably 3 to 8 mm, but is not limited thereto.

In step c), the composite resin chips and the crosslinking agent may be added to the second kneader and kneaded at 60 to 80° C. at 30 to 60 rpm, but is not limited thereto.

The semiconductive resin composition produced in step c) may be crosslinked and aged in an oven. An oven temperature may be at or above a curing temperature of a curing agent, specifically 60 to 100° C., and a crosslinking and aging time may be 10 minutes to 12 hours, but they are not limited thereto.

In addition, according to an exemplary embodiment of the present invention, the crosslinking time in step d) may be 10 minutes, preferably 12 minutes. When the crosslinking time is too short, processing stability of the semiconductive cured product in cable processing may be deteriorated.

Hereinafter, the present invention will be described in more detail with reference to the Examples and the Comparative Examples. However, the following Examples and Comparative Examples are only an example for describing the present invention in more detail, and do not limit the present invention in any way.

[Tensile Strength and Elongation]

Tensile strength and elongation were measured under the conditions of 250 mm/min according to ASTM D 638.

[Crosslink Density and Scorch Time]

A crosslink density in a crosslinked polymer composition may be determined by analysis on a moving die rheometer (MDR) at 180° C. in accordance with ASTM D5289-12. In the analysis, the crosslink density was calculated by a difference (MH-ML) between a maximum elastic torque (MH) value and a minimum elastic torque (ML) value. A scorch time (TS1) was calculated from a time to rise 1 dNm from a minimum value (ML) of torque measured at 145° C.

[Volume Resistance]

Volume resistance was measured in accordance with ASTM D991.

[Melt Index]

Melt index was measured under the conditions of 125° C. and 2.16 kg in accordance with the ASTM D1238 measurement method, and the melt index unit is g/10 min.

Example 1

A semiconductive resin composition was produced by performing kneading at 150° C. for 30 minutes in a Banbury mixer. With respect to 100 parts by weight of an ethylene butyl acrylate copolymer having a butyl acrylate content of 17 mol % and a melt index of 7.0 g/10 min, 100 parts by weight of an ethylene butyl acrylate copolymer having a butyl acrylate content of 20 mol % and a melt index of 20.0 g/10 min, 0.95 parts by weight of 1,2-dihydro-2,2,4-trimethylquinoline (Naugard SuperQ, Miwon Commercial Co., Ltd.), and 113 parts by weight of carbon black (VXC500) were kneaded at 100° C. for 30 minutes. The kneaded material was passed through a roll mill and a crusher to be produced into a chip form, 2.8 parts by weight of di[tert-butylperoxyisopropyl]benzene (AkzoNobel) as a crosslinking agent was further added in a Brabender mixer, and the mixture was impregnated at 75° C. for 10 minutes at 40 rpm and aged in an oven at 70° C. for 8 hours to produce a semiconductive resin composition.

The tensile strength, the elongation, the scorch time, and the crosslink density of the semiconductive resin composition produced were measured and are shown in Table 1, and the volume resistance was measured and is shown in Table 2.

Example 2

A semiconductive resin composition was produced in the same manner as in Example 1, except that the content of carbon black was 107 parts by weight. The tensile strength, the elongation, the scorch time, and the crosslink density of the semiconductive resin composition produced were measured and are shown in Table 1, and the volume resistance was measured and is shown in Table 2.

Example 3

A semiconductive resin composition was produced in the same manner as in Example 1, except that an ethylene butyl acrylate copolymer having a butyl acrylate content of 17 mol % and a melt index of 15.0 g/10 min was used instead of the ethylene butyl acrylate copolymer having a butyl acrylate content of 17 mol % and a melt index of 7.0 g/10 min. The tensile strength, the elongation, the scorch time, and the crosslink density of the semiconductive resin composition produced were measured and are shown in Table 1, and the volume resistance was measured and is shown in Table 2.

Example 4

A semiconductive resin composition was produced in the same manner as in Example 1, except that an ethylene butyl acrylate copolymer having a butyl acrylate content of 20 mol % and a melt index of 9.0 g/10 min was used instead of the ethylene butyl acrylate copolymer having a butyl acrylate content of 17 mol % and a melt index of 7.0 g/10 min.

Example 5

A semiconductive resin composition was produced in the same manner as in Example 1, except that 1.5 parts by weight of zinc stearate was further included with respect to 100 parts by weight of the ethylene butyl acrylate copolymer having a butyl acrylate content of 17 mol % and a melt index of 7.0 g/10 min.

Comparative Example 1

A semiconductive resin composition was produced by performing kneading at 150° C. for 30 minutes in a Banbury mixer. With respect to 100 parts by weight of an ethylene butyl acrylate copolymer having a butyl acrylate content of 17 mol % and a melt index of 7.0 g/10 min, 0.90 parts by weight of 1,2-dihydro-2,2,4-trimethylquinoline (Naugard SuperQ, Miwon Commercial Co., Ltd.), and 56.7 parts by weight of carbon black (VXC500) were kneaded at 100° C. for 30 minutes. The kneaded material was passed through a roll mill and a crusher to be produced into a chip form, 1.4 parts by weight of di[tert-butylperoxyisopropyl]benzene (AkzoNobel) as a crosslinking agent was further added in a Brabender mixer, and the mixture was impregnated at 75° C. for 10 minutes at 40 rpm and aged in an oven at 70° C. for 8 hours to produce a semiconductive resin composition.

The tensile strength, the elongation, the scorch time, and the crosslink density of the semiconductive resin composition produced were measured and are shown in Table 1, and the volume resistance was measured and is shown in Table 2.

TABLE 1

| | Example 1 | Example 2 | Example 3 | Example 4 | Example 5 | Comparative Example 1 |
|---|---|---|---|---|---|---|
| Elongation (%) | 199 | 200 | 194 | 192 | 202 | 206 |
| Tensile strength (%) | 272 | 275 | 265 | 264 | 280 | 243 |
| Scorch time (min) | 13.37 | 13.15 | 14.20 | 14.11 | 13.54 | 12.24 |
| Crosslink density (dNm) | 17.31 | 16.27 | 14.51 | 14.41 | 16.33 | 14.23 |

TABLE 2

| | Example 1 | Example 2 | Example 3 | Example 4 | Example 5 | Comparative Example 1 |
|---|---|---|---|---|---|---|
| Temperature | Volume resistance (Ω · cm) | | | | | |
| 30° C. | 28 | 28 | 33 | 35 | 25 | 58 |
| 60° C. | 34 | 38 | 58 | 51 | 31 | 62 |
| 90° C. | 95 | 147 | 162 | 163 | 92 | 134 |
| 110° C. | 129 | 193 | 226 | 169 | 126 | 169 |
| 135° C. | 126 | 178 | 221 | 184 | 115 | 184 |

Hereinabove, although the present invention has been described by specific matters, limited exemplary embodiments, and drawings, they have been provided only for assisting the entire understanding of the present invention, and the present invention is not limited to the exemplary embodiments, and various modifications and changes may be made by those skilled in the art to which the present invention pertains from the description.

Therefore, the spirit of the present invention should not be limited to the above-described exemplary embodiments, and the following claims as well as all modified equally or equivalently to the claims are intended to fall within the scope and spirit of the invention.

The invention claimed is:

1. A semiconductive resin composition comprising:

a base resin formed by mixing two ethylene butyl acrylate resins having melt indexes satisfying the following Equations 1 and 2;

carbon black;

an antioxidant; and a crosslinking agent, wherein the $MI_1$ and $MI_2$ values of the base resin satisfy the following Equation 3:

$$1 \le MI_1 \le 10 \quad \text{[Equation 1]}$$

$$11 \le MI_2 \le 30 \quad \text{[Equation 2]}$$

$$10 \le MI_2 - MI_1 \le 20 \quad \text{[Equation 3]}$$

wherein $MI_1$ is a melt index of a first ethylene butyl acrylate resin, wherein $MI_2$ is a melt index of a second ethylene butyl acrylate resin, and wherein the melt index is measured under conditions of 125° C. and 2.16 kg in accordance with a measurement method of ASTM D1238, a unit of the melt index being g/10 min.

2. The semiconductive resin composition of claim 1, wherein the base resin includes the first ethylene butyl acrylate resin having $MI_1$ of 5 to 10 g/10 min and the second ethylene butyl acrylate resin having $MI_2$ of 15 to 25 g/10 min.

3. The semiconductive resin composition of claim 2, wherein in the base resin, the first ethylene butyl acrylate resin is an ethylene butyl acrylate copolymer having a content of a structural unit derived from a butyl acrylate monomer of 15 to 18 mol % and a melt index of 5 to 10 g/10 min, and the second ethylene butyl acrylate resin is an ethylene butyl acrylate copolymer having a content of a structural unit derived from a butyl acrylate monomer of 19 to 22 mol % and a melt index of 17 to 22 g/10 min.

4. The semiconductive resin composition of claim 1, wherein the antioxidant is any one or more selected from phenolic compounds and thioether-based compounds.

5. The semiconductive resin composition of claim 1, further comprising:

a metal stearate.

6. The semiconductive resin composition of claim 5, wherein the metal stearate includes zinc stearate, calcium stearate, aluminum stearate, and magnesium stearate.

7. The semiconductive resin composition of claim 1, wherein the semiconductive resin composition includes: 30 to 100 parts by weight of the carbon black, 0.01 to 5 parts by weight of the antioxidant, and 0.1 to 10 parts by weight of the crosslinking agent, with respect to 100 parts by weight of the base resin.

8. A semiconductive resin cured product obtained by crosslinking the semiconductive resin composition of claim 1.

9. The semiconductive resin cured product of claim 8, wherein the semiconductive resin cured product has a crosslink density in accordance with a moving die rheometer (MDR) of 15 dNm or more.

10. The semiconductive resin cured product of claim 8, wherein the semiconductive resin cured product has a volume resistance in accordance with ASTM D991 of 130 Ω·cm or less at 135° C.

11. A method of producing a semiconductive resin cured product, the method comprising:

a) adding the base resin of claim 1, carbon black, and an antioxidant to a first kneader and performing kneading to produce a composite resin;

b) producing the composite resin into a composite resin chip form;

c) adding composite resin chips and a crosslinking agent to a second kneader and performing mixing to produce a semiconductive resin composition; and d) crosslinking and aging the semiconductive resin composition to provide a semiconductive resin cured product.

12. The method of producing a semiconductive resin cured product of claim 11, wherein a crosslinking time in d) is 10 minutes or more.

* * * * *